Figure 1:
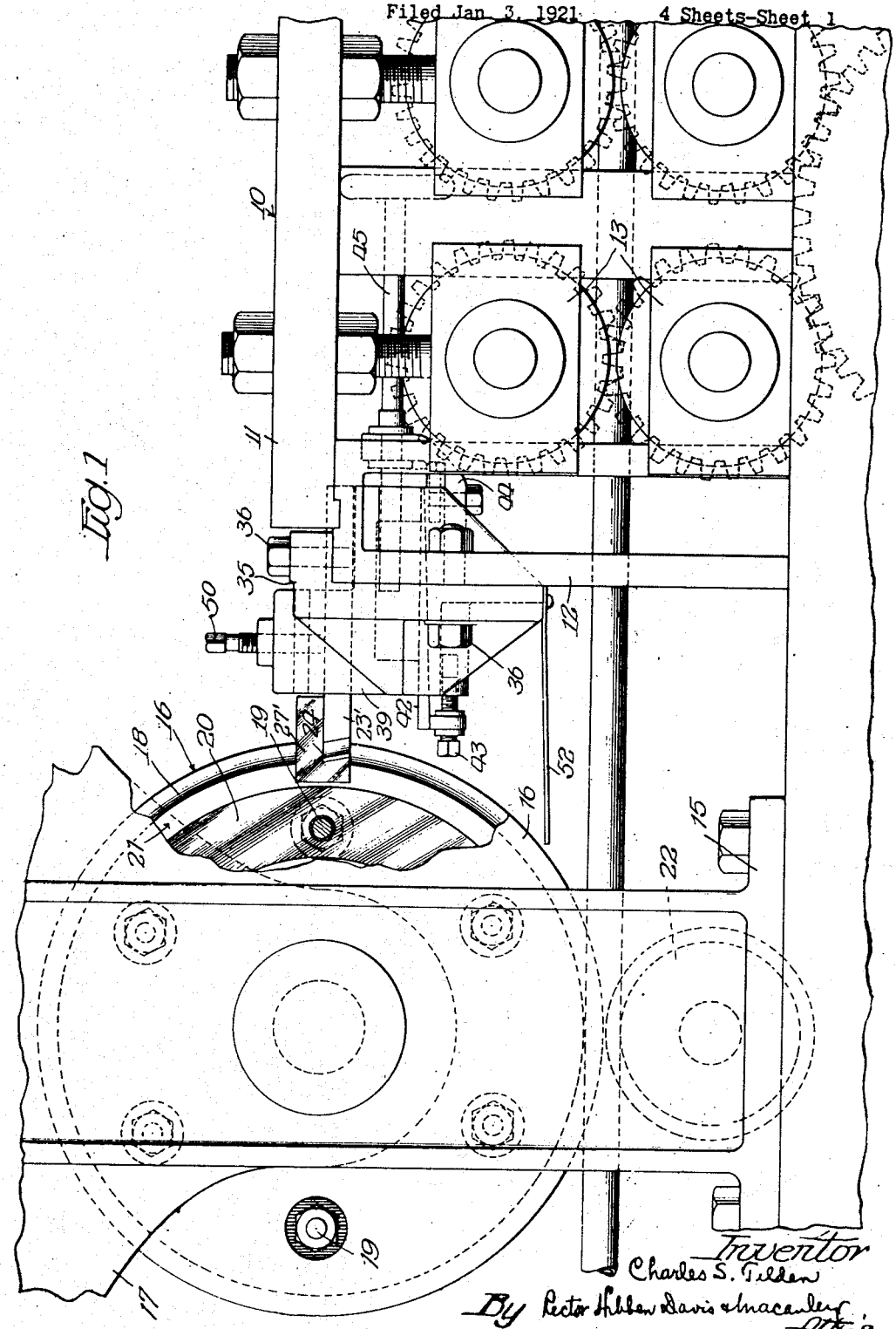

Jan. 6. 1925.                                    1,522,345
C. S. TILDEN
ELECTRIC WELDING MACHINE
Filed Jan. 3, 1921.        4 Sheets-Sheet 1

Inventor
Charles S. Tilden
By Rector Hibben Davis & Macauley
Attys

Jan. 6, 1925.  1,522,345
C. S. TILDEN
ELECTRIC WELDING MACHINE
Filed Jan. 3, 1921  4 Sheets-Sheet 2
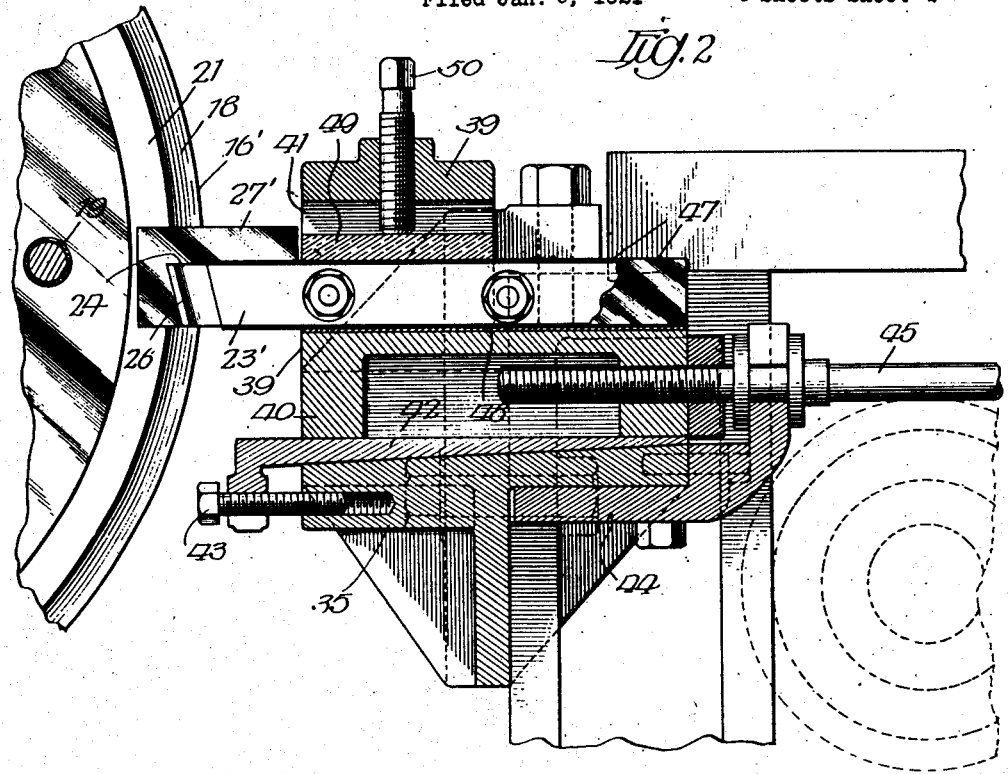
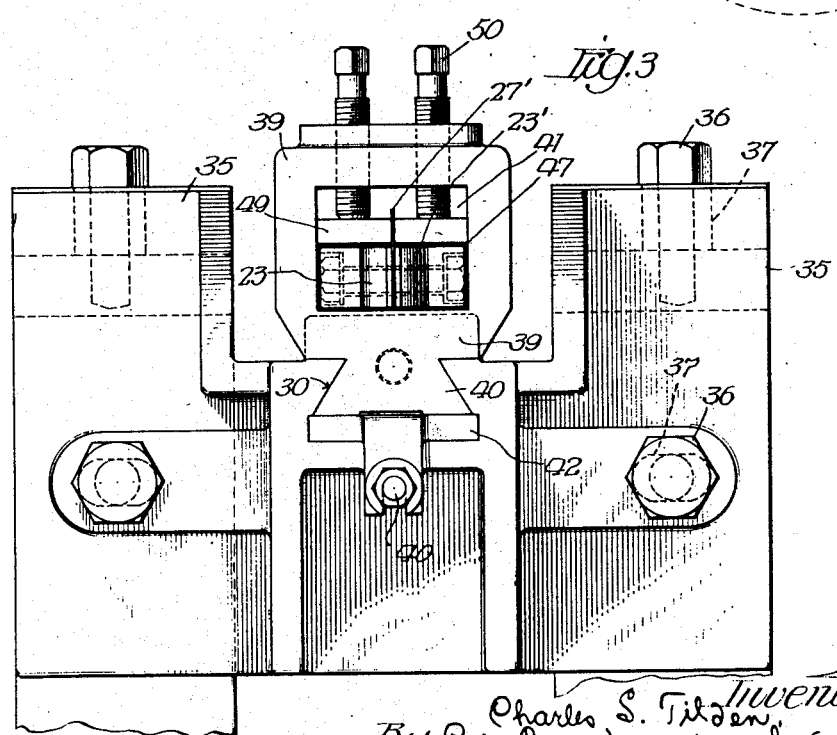

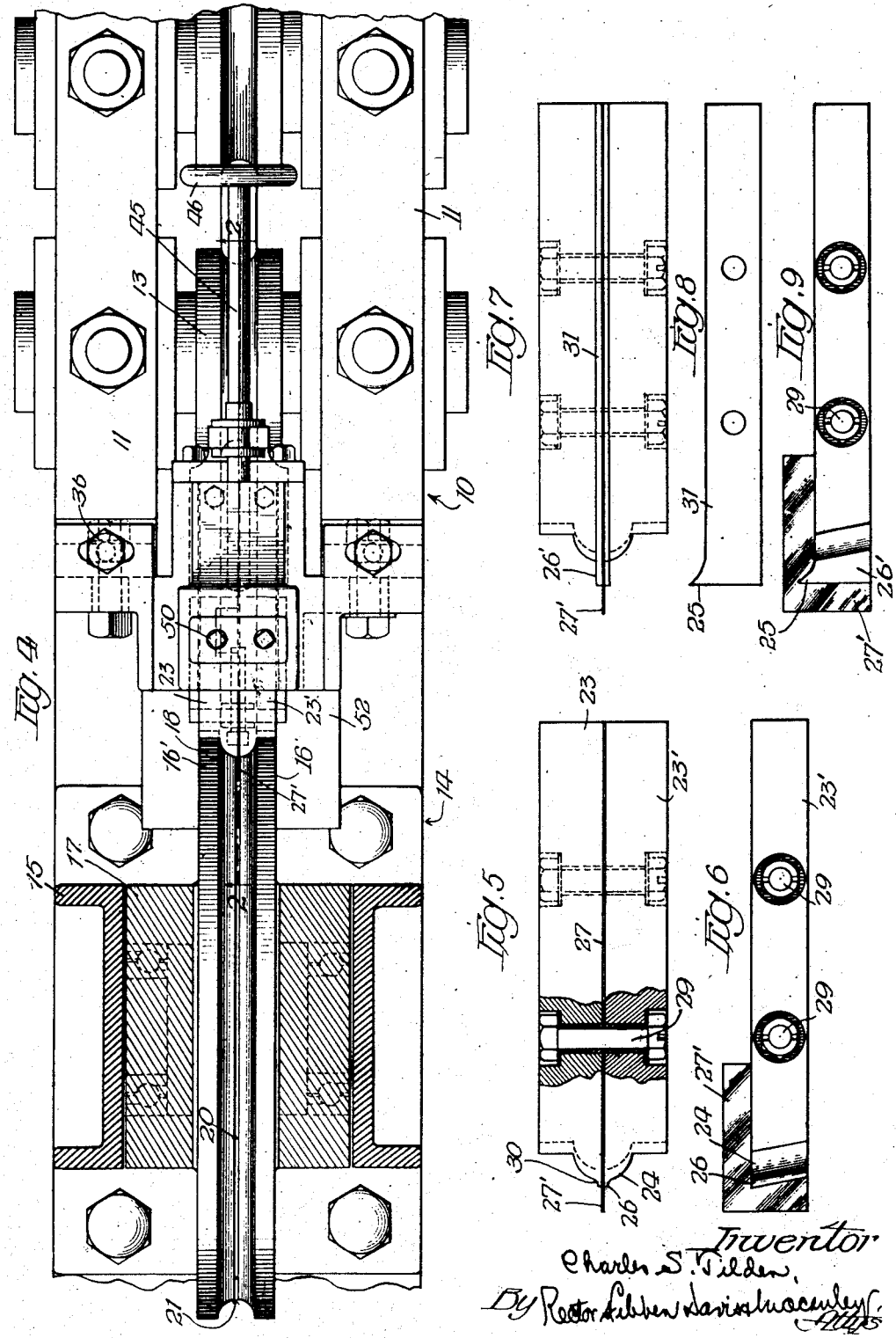

Jan. 6. 1925.
C. S. TILDEN
1,522,345
ELECTRIC WELDING MACHINE
Filed Jan. 3, 1921    4 Sheets-Sheet 4
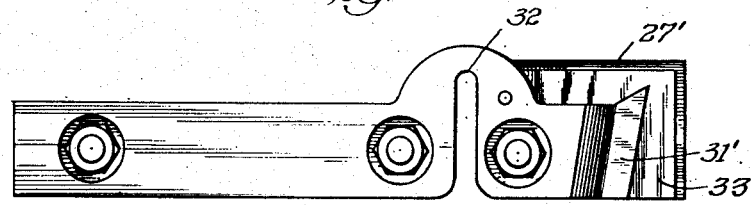
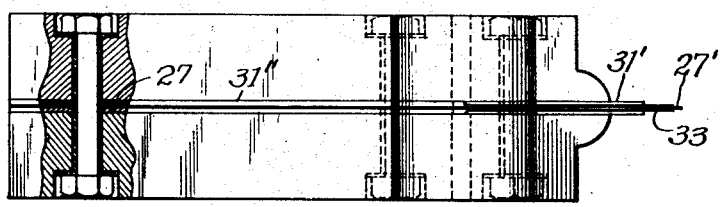
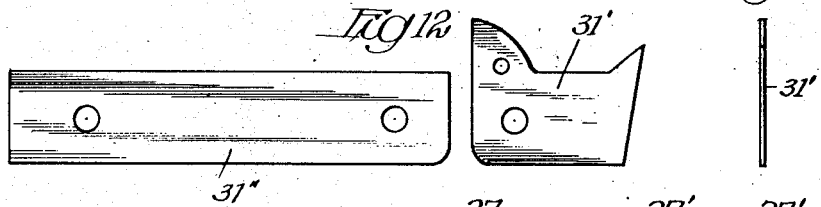
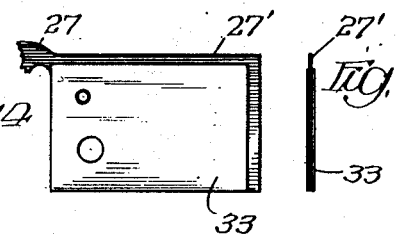
Inventor
Charles S. Tilden
By Rector Hibben Davis Macauley
Attys.

Patented Jan. 6, 1925.

1,522,345

UNITED STATES PATENT OFFICE.

CHARLES S. TILDEN, OF CLEVELAND, OHIO.

ELECTRIC WELDING MACHINE.

Application filed January 3, 1921. Serial No. 434,663.

*To all whom it may concern:*

Be it known that I, CHARLES S. TILDEN, a citizen of the United States, residing at Cleveland, in the county of Cuyahoga and State of Ohio, have invented certain new and useful Improvements in Electric Welding Machines, of which the following is a specification.

In the electric butt-welding of tubing, and particularly of steel-tubing, it is known practice to pass open-seamed tube-stock through a welding throat that is formed by seam-straddling roller electrodes and tube-supporting roller-means, complementally grooved; the size of the throat or pass being such as to squeeze the seam-edges together under requisite pressure, and the current that is supplied to the copper electrodes being of suitable voltage and amperage to heat the tube-stock for effecting the weld.

Although machines as above characterized are commercially operated with success, I have found a grave difficulty to exist in the maintenance of proper welding conditions because of the action of the tube-stock upon the roller electrodes under those conditions requisite for welding, namely, the heating of the stock to welding temperature at its edges, and the application of very considerable pressure upon the stock in its passage past the seam-straddling electrodes. Under such heat and such pressure the metal along the seam is always more or less extruded into the space between the confronting electrode-faces; particles of it fuse with particles of the copper, especially at and near the electrode-edges where the side faces and the contact-grooves meet; flecks, chips and slivers of steel and oxidized metal attach themselves to the contact surfaces or grooves and to the faces of the electrodes; and in a run of the machine these conditions develop cumulatively, inevitably and rapidly decreasing the effectiveness of the machine and sometimes causing its complete failure to weld the stock. Not only does the tendency of the electrodes to accumulate these steel or steel-and-copper particles or growths between their confronting faces tend toward, and sometimes result in, short-circuiting of the electrodes, but the adhesion of such particles, chips and growths to the arcuate contact surfaces of the electrodes causes the electrodes to be forced out of proper contact with the tube stock in spots, thus varying the resistance of the welding circuit, seriously interfering with proper current flow, and causing both the copper contact surfaces and the passing steel to become burned, pitted and roughened. Obviously enough one result of this sort of electrode-destructive action in a welding machine is undue rapidity of wear of the electrodes, with consequent necessity for frequently changing electrodes, grinding damaged ones down, and other expensive maintenance operations; but even more serious is the fact that the fluctuations of pressure conditions and current supply conditions, above referred to, all react on the tube stock in its passage through the welding throat and militate against successful welding, especially in a high-speed machine; i. e., one through which the tube-stock is fed rapidly.

I have discovered that the electrodes may successfully and effectively be maintained in good operating condition, substantially free from roughness, pitting and particle-accumulation, in the continuous operation of the machine, and with consequent betterment of the product, by combining with each electrode a suitably constructed profiling tool, constantly working thereon, for removal of adhering particles from, and for constantly tending to true the surfaces of, the electrodes; and in such combination and further the construction and arrangement of a suitable tool features of my present invention reside.

In the drawings, Fig. 1 is a side elevation with parts broken away showing portions of a tube-welding machine embodying my invention; Fig. 2 is a vertical section on line 2—2 of Fig. 4; Fig. 3 is a front elevation of the tool and holder; Fig. 4 is a plan view of parts shown in Fig. 1; Figs. 5 and 6 are plan and side views of a tool; Figs. 7, 8 and 9 are details of a tool of slightly modified form; and Figs. 10, 11, 12, 13, 14 and 15 are details of another modified tool.

In the drawings I have shown as a single machine, equipped for embodying my invention, a general construction adapted for high-speed tube-welding but it will be understood that changes may be wrought in the machine construction and accordantly in the specific form of the tool associated therewith, within the spirit of my invention.

The welding machine proper is illustrated as comprising a tube-stock-forming section 10 of suitable construction to form strip steel into open-butt-seamed stock, 11 indicating a longitudinal frame-piece or stringer, and 12 a frame-standard thereof, while 13 indicates a pair of positively-driven rolls conventionally representing the last tube-forming pass. If such a tube-forming section is used, it may deliver the stock directly to the welding section 14, the roller elements of which may be frictionally rotated by the passing stock. Thus in frame extension 15 the companion roller electrodes 16 and 16' are rotatably mounted, these being electrically connected by suitable means with the terminals of the secondary circuit of a transformer 17 adapted to supply alternating current of suitable voltage and amperage thereto. While such electrodes, circumferentially provided with contact grooves 18 of arcuate section may be separately mounted and wholly disconnected one from the other, I prefer to employ a construction as shown, wherein the two electrodes have their confronting faces in perfect parallelism, electrically separated but mechanically coupled together, as by suitable provision of insulated bolts 19 and an insulating separator structure 20, the insulation 20 being set back somewhat from the grooved portion of the electrodes so that at the center of the arc spanned jointly by the electrode grooves there is a narrow, parallel walled circumferential slot recess 21 in register with the center of which the seam-cleft of the tube stock will travel in the operation of the machine. Suitable roller means,—for example, the grooved guiding and supporting roller 22 horizontally disposed below the electrodes may be provided in any desired form and arrangement to complete the welding throat, the circular pass or opening afforded by these coacting roller members being of slightly less diameter than the diameter of the tube stock. The machine, as thus far described, typifies one now-known construction, for illustrative purposes, and its operation is understood by those skilled in the art.

In combination with the roller electrodes I provide a tool comprising generally a pair of electrically separated or insulated profiling members having their active or cutting ends shaped in conformity with the cross-sectional contours of the two respective electrodes throughout their contact grooves 18 and preferably conforming also to the confronting border portions of slot 21 immediately adjacent said grooves, these two insulated tool members being so disposed as constantly to coact smoothly with the said surfaces of the electrode rollers, constantly to clean the latter and preserve the smoothness and true shape of the affected surfaces. Specifically, since the electrode rollers are preferably mechanically united, as stated, so the respective insulated tool members are preferably mechanically interconnected in order that all their movements may be effected in unison through suitable adjusting means to be described, and in the specific forms herein shown the two tool-sections are bolted together as most convenient construction.

The simplest form of tool shown (Fig. 5) comprises counterpart right and left-hand members 23, 23', each being a rectangular tool-steel bar with its forward or active end having a cutting edge 24 shaped, in plan, to correspond with a section of the grooved periphery of the respective roller electrode, and with a small slot-clearing projection 26 arranged to enter the slot between the electrodes. This front end of the tool is sloped back from the cutting edge as shown to provide draft or clearance in a fashion common in cutting tools. Between the two tool members is disposed a mica strip 27 that (integrally or by an added piece) projects above the cutting edge 24 and beyond the end of the tool, so forming a fin 27' of insulating material to prevent bridging of metal-pieces across the insulating strip of the tool. These two tool sections may be secured together by suitably insulated bolts 29. In some welding work it is desirable that the contact groove 18 and slot-face of the electrodes shall not meet in a sharp line, and when this is a desideratum the tool (as shown in Fig. 5) may be provided with a slight fillet 30 to correspond with the desired curve of the electrode edge.

In Figs. 9 and 10 I have shown slightly modified forms of the tool, Fig. 9 illustrating a construction with a raised nose or plow formation 25 at its cutting edge for the groove-conforming portion of the tool, and with the slot-clearing projections 26' provided on thin plates 31 that are mounted flat against the confronting surfaces of the tool members for ready replacement when worn or broken. In Figs. 10 to 15 the tool is made with a spring shank having its spring bow or yoke at 32 to make the active end somewhat yielding and to prevent chattering of the tool. In this instance the removable plates 31' and 31'' are made to extend only to the spring yoke while, in order to prevent slivers of steel from puncturing the mica fin 27' the greater portion of such fin is metal-reinforced, being shown as overlain on each side by a very thin covering plate 33 of steel.

When used in a machine as hereinbefore specifically described, either stated form of tool will be mounted so that its cutting edge coacts with the electrodes substantially on a horizontal diameter thereof, preferably on the side from which the tube-stock is fed to the electrodes, and while the mounting may be variously contrived I preferably employ a mounting as follows: On the frame members 11, 12 is bolted, at end and top, a base block 35, the retaining bolts 36 extending through transverse slots 37 so that the block may be adjusted laterally on the machine frame. This base block is shaped to provide a horizontal dovetail slideway 38 to receive the tool holder or slide 39 which has, complementally a dove-tail rib 40 and above such rib a horizontal tool receiving aperture 41. The slide bearing is adjustable for wear compensation by an underlying wedge 42 fastened by a screw 43 which takes through a down-turned front lip of the wedge and is threaded into the base block 35. To the lower rear portion of the base block is connected a detachable bracket 44 slotted to engage between collars on a feed-screw 45 which at one end carries a handwheel 46 and at its other end is threaded into the tool slide 39. The tool 23, 23' is enclosed around its four sides by an envelope 47 of insulating material and is placed in the aperture 41 of its slide to rest on a shim or shims 48 (if necessary), where it is secured by a clamp plate 49 laid over the top of the tool bar and borne upon by set-screws 50 tightly to hold the tool in place. Manifestly with the fore-and-aft adjustment of the tool slide by the handwheel and feed screw, the vertical adjustability of the tool in its carrying slide by addition or removal of shims and the transverse adjustment of the base block on the machine frame, perfect positioning of the tool for its work may be attained.

Preferably, further, to prevent scrapings from the electrodes from falling on the stock and being carried through the welding throat I secure a shield-plate 52 to the bottom of the base-block 35, extending said plate laterally beyond the tube-stock and forward beyond the end of the tool.

I have found that by constantly scraping and truing the electrodes I am enabled greatly to aid in securing rapid, continuous and perfect welding, and that by the use of my invention not only is electrode life prolonged and maintenance expense reduced but many difficulties in the commercial electric-butt-welding of tubing are overcome that heretofore have been normally encountered and heretofore have erroneously been regarded as flowing from faulty current-regulation or from defective tube stock or improper surface conditions in the tube stock; such difficulties have heretofore been sought to be remedied by expensive and ineffective expedients along other lines, but I believe that I am the first person to prevent their occurrence. It will be understood by those skilled in the art that in its broader aspects my invention is susceptible of many changes in detail and in carrying the same out in connection with machines of specifically different electrode-arrangement from that herein illustrated and under other variant conditions of application, within the scope of the appended claims.

I claim:

1. In a machine for electrically butt-welding tubing, the combination with bipolar coaxial relatively-insulated roller electrodes and means coacting therewith to form a welding throat, of electrode-cleaning means comprising an insulated two-part tool, each of said parts arranged to act upon the entire contact surfaces of said electrodes to remove adhering bodies therefrom.

2. In a machine for butt-welding tubing, means forming a welding throat including a pair of grooved electrodes relatively-insulated and complemental grooved roller means, in combination with a pair of cleaning-tool members relatively-insulated from each other respectively shaped for profiling the electrode contact surfaces, and means for securing said tool members in position to act on said electrodes.

3. In a machine for electrically butt-welding tubing, the combination with a pair of peripherally grooved opposing roller-electrodes having a space between their confronting faces and complementally-grooved roller-means forming with said electrode-grooves a tube-stock-constricting throat, of a pair of profiling-tool members insulated from each other and disposed respectively to act upon the confronting edge-portions and contact-groove surfaces of the electrodes.

4. In a machine for electrically butt-welding tubing, the combination with peripherally grooved opposing roller-electrodes and complemental roller-means forming with said electrode-grooves a tube-stock constricting throat, of a pair of profiling-tool members insulated from each other and disposed to act upon the contact grooves of the electrodes, and means rigidly connecting said tool members together.

5. A metal-cutting tool for profiling opposed energized electrodes comprising complemental profiling sections insulated from each other.

6. A metal-cutting tool for profiling opposed energized electrodes comprising complemental profiling sections insulated from each other, and secured together to form a unitary structure.

7. A metal-cutting tool for profiling opposed complemental energized electrodes comprising complemental profiling sections, an interposed insulating body extending in a fin beyond the cutting portions of said sections, an insulated means uniting said sections and the insulating body.

8. A metal-cutting tool for profiling opposed complemental energized electrodes comprising complemental profiling sections, an interposed insulating body extending in a fin beyond the cutting portions of said sections, and a metal body reinforcing said insulating fin against puncture.

9. A metal-cutting tool for profiling opposed complemental energized electrodes comprising complemental profiling sections, an interposed insulating body extending in a fin beyond the cutting portions of said sections, metallic shields for the sides of said fin, and means for uniting said parts to form a unitary mechanical structure.

10. In a machine for electrically buttwelding tubing, the combination of a frame, opposed roller electrodes and complemental rolls thereon forming a welding throat or pass, a pair of profiling tool members for removing metal bodies from the contact surfaces of the respective electrodes and means for feeding said tool members simultaneously toward the electrodes.

11. In a machine for electrically-buttwelding tubing, the combination of a frame, opposed roller electrodes and complemental roller means thereon, forming a welding throat or pass, a profiling tool for removing metal bodies from the contact surfaces of the electrodes comprising tool sections insulated from each other, a holder for said tool sections, a base for said holder mounted on the machine frame, and means for adjusting said holder with respect to said base.

12. In a machine for electrically buttwelding tubing, the combination of a frame, opposed roller electrodes and complemental roller means thereon, forming a welding throat or pass, a profiling tool for removing metal bodies from the contact surfaces of the electrodes comprising tool sections insulated from each other, a holder for said tool sections, a base for said holder mounted on the machine frame, means for adjusting said holder with respect to said base, and means for adjusting said base with respect to the machine frame.

13. In a tube welding apparatus, a welding roll comprising two welding members for engaging the tubing on opposite sides of the seam, said roll being provided with a groove for receiving the tubing, a transformer having a secondary including pole pieces disposed adjacent to the respective welding members and electrically connected thereto, means for dressing the roll comprising a two-part tool in constant contact with said roll, said parts separated by a projecting insulating fin, and arranged to simultaneously dress the periphery of the welding members.

CHARLES S. TILDEN